(12) United States Patent
Ezaki et al.

(10) Patent No.: US 6,263,506 B1
(45) Date of Patent: Jul. 17, 2001

(54) DATA TRANSMISSION AND RECEPTION DEVICE AND SYSTEM, DATA TRANSMISSION METHOD AND PARAMETER SETTING METHOD FOR DATA RECEPTION DEVICE

(75) Inventors: Tadashi Ezaki; Jun Hirai, both of Tokyo; Teruhiko Kori, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/919,692

(22) Filed: Aug. 28, 1997

(30) Foreign Application Priority Data

Sep. 10, 1996 (JP) .................................................... 8-239425

(51) Int. Cl.⁷ ............................ H04N 7/173; H04N 7/20; H04N 7/16
(52) U.S. Cl. ............................. 725/116; 725/67; 725/68; 725/70; 725/132; 725/140; 725/152
(58) Field of Search .................................. 348/7, 10, 12; 455/3.1, 4.1, 4.2, 5.1; 709/220; 725/50, 54, 63, 67, 68, 70, 71, 80, 116, 132, 140, 141, 152

(56) References Cited

U.S. PATENT DOCUMENTS 4,617,657 * 10/1986 Drynan et al. ...................... 370/394
5,140,419 * 8/1992 Galumbeck et al. ................ 348/465
5,315,448     5/1994 Ryan .
5,404,505 * 4/1995 Levinson ............................ 707/10
5,666,293 * 9/1997 Metz et al. ......................... 709/220
5,802,154 * 9/1998 Dimolitsas et al. ............ 379/100.17
5,894,516 * 4/1999 Brandenburg ......................... 705/51
5,951,639 * 9/1999 MacInnis ............................. 709/217

FOREIGN PATENT DOCUMENTS 0 691 787    1/1996 (EP) .

* cited by examiner

Primary Examiner—Andrew Faile
Assistant Examiner—Hai V. Tran
(74) Attorney, Agent, or Firm—Frommer Lawrence & Haug, LLP.; William S. Frommer; Gordon Kessler

(57) ABSTRACT

A data transmitting method comprising the steps of generating parameter setting data for various items of hardware, embedding the parameter setting data into a control code and transmitting that control code. The parameter setting data sets parameters for a plurality of hardware versions and includes parameter setting data common to at least first and second hardware versions, parameter setting data limited to a first hardware version, and parameter setting data limited to a second hardware version. Thus, the first version of hardware utilizes parameter setting data intended for it while the second version of hardware utilizes parameter setting data intended for it.

33 Claims, 17 Drawing Sheets

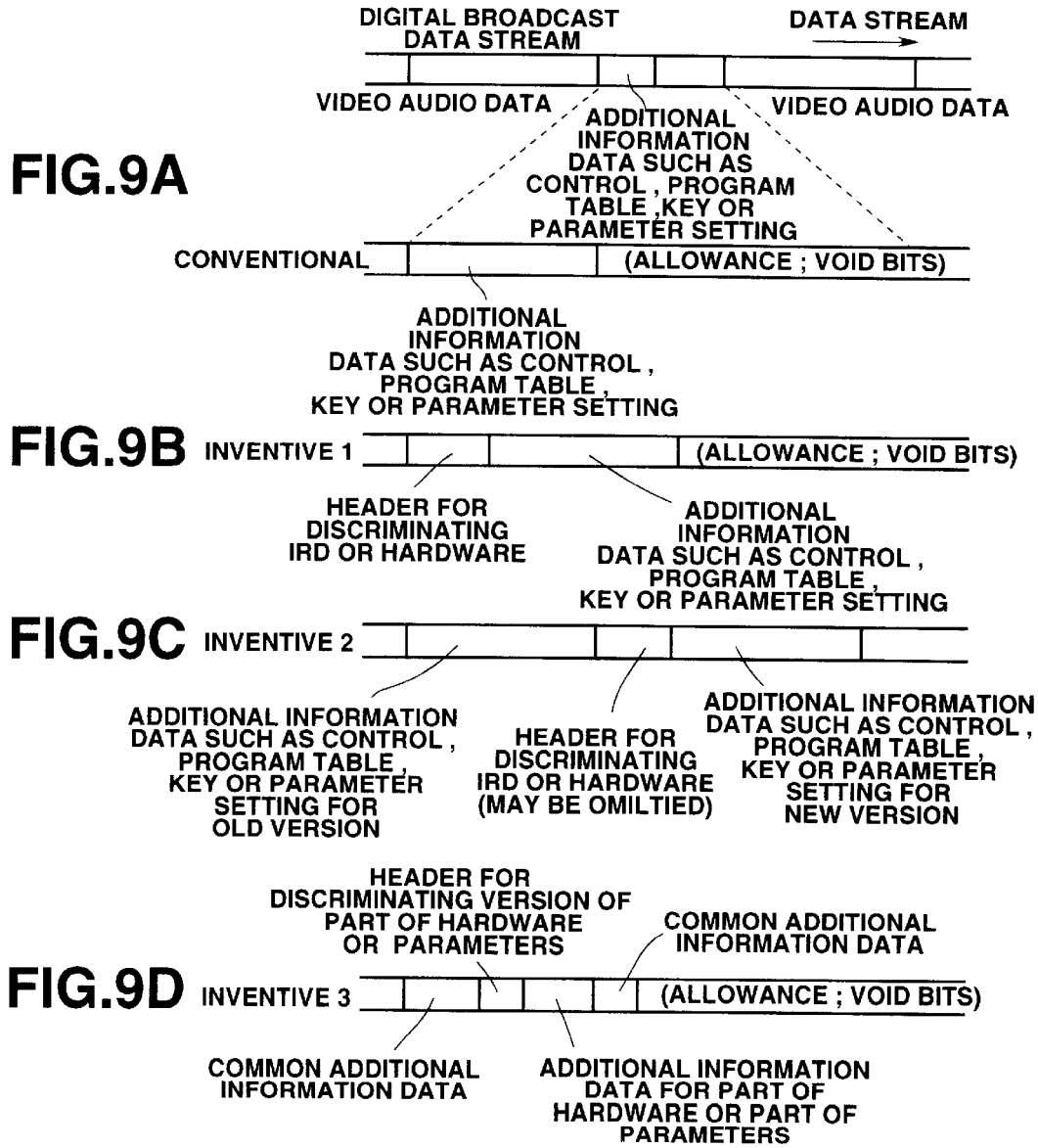

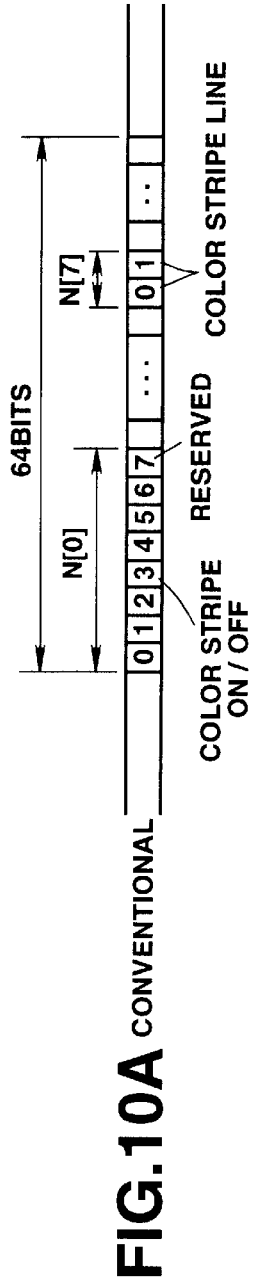
FIG.10A CONVENTIONAL
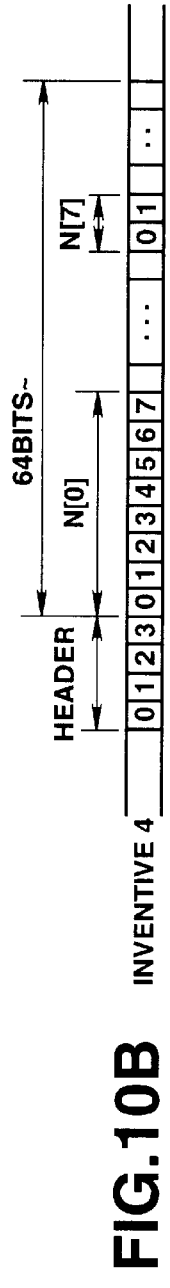
FIG.10B INVENTIVE 4
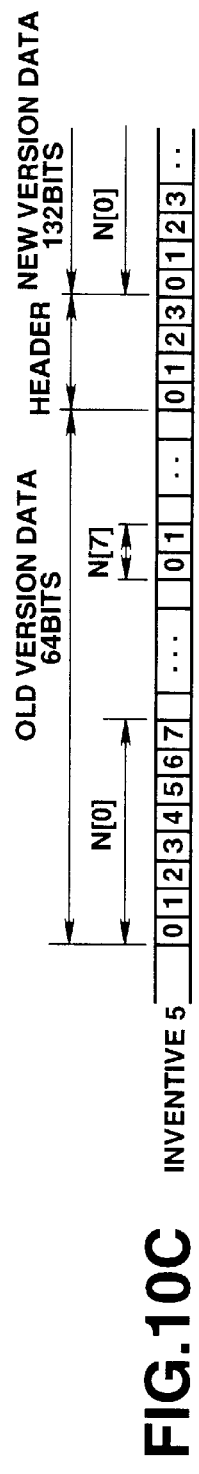
FIG.10C INVENTIVE 5
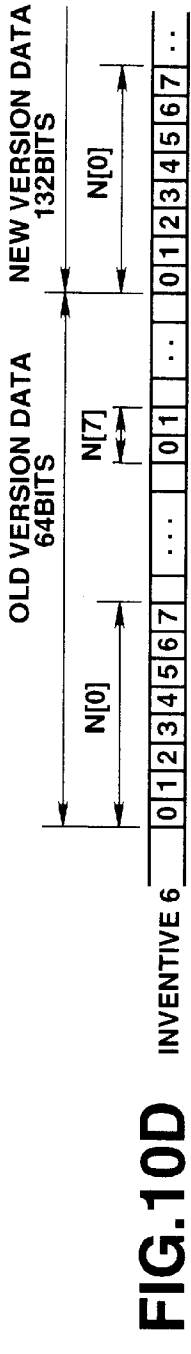
FIG.10D INVENTIVE 6

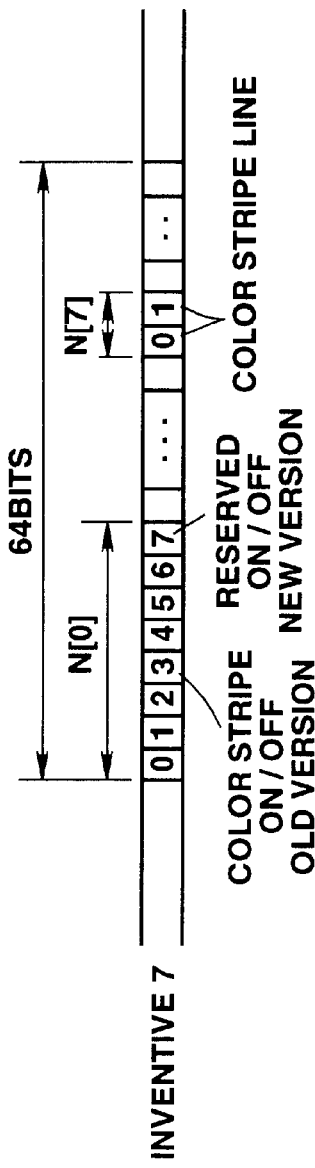
FIG.11A INVENTIVE 7
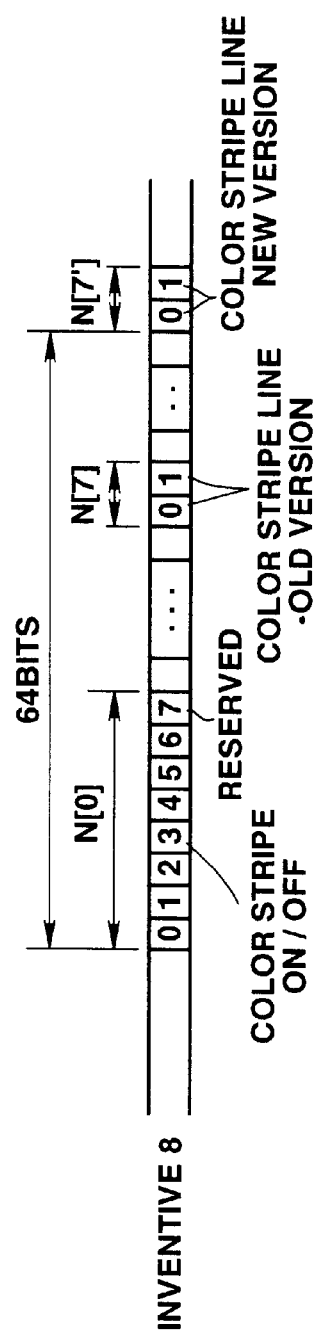
FIG.11B INVENTIVE 8

DATA TRANSMISSION AND RECEPTION DEVICE AND SYSTEM, DATA TRANSMISSION METHOD AND PARAMETER SETTING METHOD FOR DATA RECEPTION DEVICE

BACKGROUND OF THE INVENTION

This invention relates generally to a data transmission and reception system, and more particularly a data transmission device, a data reception device, a data transmission and reception system, a data transmission method and a parameter setting method for a data reception device.

In accordance with the development of digital data transmission techniques, digital satellite broadcasting systems based on the picture compression technique known as MPEG2 is finding practical application. FIG. 1 depicts the structure of an illustrative digital satellite broadcasting system based upon the MPEG2 picture compression technique convention. This illustrative digital satellite broadcasting system includes a satellite broadcasting station 210 having a broadcasting antenna 211 and a broadcasting satellite 220 for receiving broadcast signals sent from satellite broadcasting station 210 via broadcasting antenna 211. Broadcasting satellite 220 is also configured for retransmission of the received broadcast signals to satellite broadcasting receivers 230, which are installed in the premises of each service subscriber.

In the digital satellite broadcasting system depicted in FIG. 1, various programs furnished by the program purveyor are encoded by an MPEG encoder to form an MPEG transport stream (MPEG-TS). This MPEG-TS is then modulated for satellite broadcasting and is transmitted to broadcasting satellite 220. Broadcasting satellite 220 then in turn transmits the received MPEG-TS to each satellite broadcasting receiver 230 on the premises of each service subscriber.

Satellite broadcasting receiver 230 acts as a reception terminal. Such a reception terminal, known as an integrated receiver and decoder (IRD) or a set top box (STB), is installed in the premises of each service subscriber. A television receiver 240 and a video tape recorder 250 are connected to satellite broadcasting receiver 230.

FIG. 2 depicts a block diagram of satellite broadcasting receiver 230 of the illustrative digital satellite broadcasting system depicted in FIG. 1. Satellite broadcasting receiver 230 includes a station selection unit (tuner) 231, a demodulator 232, a data decoder 233, a descrambler 234, an MPEG decoder 235 and a video outputting signal processor 236.

During the operation of satellite broadcasting receiver 230, the user selects a desired channel to be viewed by using station selection unit (tuner) 231. The signals of the selected channel are demodulated to MPEG encoded digital signals by demodulator 232. The MPEG encoded demodulated digital signals are supplied to data decoder 233 and to descrambler 234.

Typically, the MPEG encoded digital signals are transmitted in scrambled form. Key decoding information for allowing descrambler 234 to descramble the MPEG encoded digital signal is furnished from the service purveyor to each subscriber on an IC card 237 or the like. Data decoder 233 furnishes the key decoding information supplied from IC card 237 to descrambler 234 for descrambling the MPEP encoded digital signal. Descrambler 234 then descrambles the signal, and outputs an unscrambled signal to MPEG Decoder 235. If the delivered MPEG encoded digital signal is not scrambled, descrambler 234 outputs the signal received from demodulator 232 to MPEG decoder 235 without performing any descrambling processing thereon.

After descrambling, the descrambled MPEG encoded digital signal is supplied to MPEG decoder 235 which decodes the descrambled MPEG digital signal and outputs a decoded signal to video outputting signal processor 236. The video outputting signal processor is formed of a video encoder, such as an NTSC encoder 361, a copy protection signal generator 362, an adder 363 and a D/A converter 364. Video encoder 361 converts the digital video signals furnished from MPEG decoder 235 into a pre-set standard television system format, such as NTSC system format, by way of example. The resulting formatted signal is converted by D/A converter 364 from digital data to an analog video signal in accordance with the pre-set television system standard. This standard format, analog video signal is then output from video outputting signal processor 236, and satellite broadcasting receiver 230 (FIG. 1) to television receiver 240 and/or video tape recorder 250.

The digital satellite broadcasting system may include a pay-per-view service, which includes charging the viewer a special fee to permit the viewing of a specified program. In general, if the subscriber selects a pay-per-view program from a program table, which is supplied via the satellite transmission procedure noted above, the program selection information is supplied over a telephone network, for example, from satellite broadcasting receiver 230 to the supervising company. This information may also be transmitted via broadcasting satellite 220, or other appropriate transmission methods. Upon receipt of a request to view a program, the key decoding information for decoding the program signal is sent to the individual satellite broadcasting receiver 230 of the subscriber via the satellite transmission procedure noted above. This decoding information is used by satellite broadcasting receiver 230 to decode the incoming program as noted above. The subscriber is charged for viewing the program at the same time the signal is supplied to the subscriber.

The pay-per-view program is transmitted having a configuration which, while permitting proper viewing of the program via television receiver 240, evades recording by video tape recorder (VTR) 250, by way of example, to ensure proper copyright protection of the transmitted program. To this end a copy protect signal for disabling picture recording is appended to the pay-per-view program. This copy protect signal may be of the type developed by Macrovision Corporation.

Typically, the digital satellite broadcasting system sends various additional data, along with video and audio data, such as the key decoding data for decoding a particular program, a program table, and parameters for instructing the receiving or processing hardware of program satellite broadcasting receiver 230. Data decoder 233 of satellite broadcasting receiver 230 detects whether a hardware parameter instructing the use of copy protection signal generator 362 of video outputting signal processor 236 is present. If this parameter is detected, the copy protection signal generator is turned on in order to generate the copy protect signal which is then added to the digital video signals by adder 363 pursuant to the pre-set standard television system format.

Referring next to FIG. 3, a specific example of data decoder 233 will be further described. Data decoder 233 comprises a 64-bit control code register 332, a control code analyzer 333 and an other data stream processor 334. The demodulated signal received from demodulator 232 is furnished via switch 331 to other data stream processor 334, which extracts information, such as a program table by way of example, to control the display of the program table. However, when a control code is detected in the signal received from demodulator 232, switch 331 is activated to direct the signal to 64-bit control code register 332. This control code, which typically is a 64-bit control code, is extracted from the demodulated signal and placed into control code register 332. The control code is analyzed by control code analyzer 333 in order to properly set the parameters for other hardware items of the system, and for on/off control of the copy protect signal.

Two formats normally are provided for the copy protect signal: a pseudo horizontal synchronization pulse or a color stripe.

As is shown in FIG. 4, the pseudo horizontal synchronization pulse copy protect signal system inserts a pseudo horizontal synchronization pulse into the vertical blanking period of a video signal, thereby inducing malfunction of the usual automatic gain control (AGC) circuit of a VTR. This deteriorates the picture level and quality of the image which is to be recorded to a practically intolerable level. Thus, in this manner, satisfactory picture recording is inhibited by the pseudo horizontal synchronization pulse copy protect signal.

As is shown in FIG. 5, the color stripe, copy protect signal system inverts the phase of four lines of the color burst signal every 20 lines on the screen. This induces color inversion during VTR reproduction, which in turn deteriorates the recorded picture level to a practically intolerable level. Hence, satisfactory picture recording is inhibited by the color stripe copy protect signal.

However, it is possible that the copy protect signal will not only disable picture recording, as described above, but also will affect the operation of the television receiver. Thus, there are occasions wherein a particular television receiver may be subject to interference from the copy protect signal. Such a situation is depicted, by way of example, in FIG. 6.

A system has been developed which is able to remove this interference from a particular television receiver by modifying the parameters of the copy protection signal generator or, alternatively, by turning off a part of the copy protect signal. For example, if the color stripe copy protect system, which inverts the phase of the color burst signal on four out of every 20 lines, causes interference in a particular television receiver, such interference can be diminished or eliminated by changing the number of lines of the color burst signal which are phase inverted from four lines to two lines.

As another example, television interference may be reduced by phase inverting not all but only part of each color burst signal. This example is shown in FIG. 7 wherein only half of the burst signal in each line is phase inverted. However, with this scheme, older hardware, which inverts the entire burst in four lines will not be able to generate this newer type of copy protect signal. Additionally, since the transmitted control code would contain instructions for generating this never type of copy protect signal, instructions for the older copy protect signals will not be sent so that the older hardware will not be instructed to generate cannot generate the older type of copy protect signals. Thus, the newer type of copy protect signal cannot be produced unless new hardware, including a new integrated circuit, is used. Since the older copy protection hardware requires the older transmitted copy protect signals, and the newer hardware requires the newer transmitted copy protect signals, the older hardware attempts to process the newer signal or if the newer hardware attempts to process the older signal, interference will result.

Therefore, it would be beneficial to provide a transmission system which allows for both old and new hardware to function without interference.

OBJECTS AND SUMMARY OF THE INVENTION

Accordingly, it is an object of this invention to provide an improved data transmission and reception system which overcome the aforementioned drawbacks.

Another object of the invention is to provide an improved data transmission and reception system which allows for the implementation of updates in the hardware associated with the system.

A further object of the invention is to provide an improved data transmission and reception system which prevents videotaping of a transmitted program even if updated hardware has been implemented in the system.

Yet another object of the invention is to provide an improved data transmission and reception system in which the transmitted data includes parameter settings for a variety of hardware versions, each hardware version being capable of utilizing all of the parameter settings intended for it.

A still further object of the invention is to provide an improved parameter setting method for use with a data reception device.

Yet a further object of the invention is to provide an improved parameter setting method for use with a data reception device which prevents video taping of a transmitted program even if updated hardware has been implemented in the data reception device.

Still another object of the invention it to provide an improved parameter setting method for use with a data reception device in which data received by the data reception device includes parameter settings for a variety of hardware versions, each hardware version being capable of utilizing all of the parameter settings intended for it.

Still other objects and advantages of the invention will in part be obvious and will in part be apparent from the specification and drawings.

In accordance with the present invention, a data transmission and reception device, a data sending method and a parameter setting method for a data reception device are provided whereby optimum parameters are set in hardware, even when the version of the hardware changes, without producing any of the inconveniences which may otherwise be caused by differences in hardware versions.

A data transmitting method according to the invention includes the steps of generating parameter setting data for various items of hardware, including a plurality of hardware versions, embedding the parameter setting data into a control code and transmitting that control code. Thus, regardless of the version of the hardware which is controlled by the control code, optimum parameters for each hardware version are transmitted, and are set without producing inconveniences due to these differences in the hardware versions.

In accordance with this data transmitting method, discrimination data for discriminating between a plurality of hardware versions is generated and embedded as a header in the aforementioned parameter setting data.

Thus, when parameter setting data for both the new version hardware and the old version hardware are transmitted, the parameter setting data for the new version of the hardware is ignored by the old version of the hardware and the old version of the hardware reads only the parameter setting data intended for it. However, the new version of the hardware reads the control code which contains the parameter setting data intended for the old hardware, and this control code indicates that data for a newer hardware version exists. Then the parameter setting data for the new hardware version, which also is contained in the control code, is read from the signal by the new hardware and the parameter setting data for the older hardware version is ignored.

A data transmission device constructed in accordance with the invention includes a parameter setting data generator for generating parameter setting data for various items of hardware including a plurality of hardware versions, and a transmitter for transmitting as at least a portion of the control code the parameter setting data for the various hardware versions. A data receiving device for receiving the parameter setting data extracts the appropriate data, in accordance with its hardware version. In this manner, regardless of the hardware version employed, optimum parameters can be set for the appropriate hardware version without producing inconveniences due to differences in the hardware versions.

The invention accordingly comprises the several steps and the relation of one or more of such steps with respect to each of the others and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 9A to 9D illustrate examples of data streams which may be utilized in the digital satellite broadcasting system of FIG. 8;

FIGS. 10A to 10D illustrate examples of actually sent data for triggering a copy protect signal;

FIGS. 11A and 11B illustrate additional examples of actually sent data for triggering a copy protect signal;

DETAILED DESCRIPTION OF THE PREFERRED EMBODIMENTS

Making reference to the drawings, preferred embodiments of the data transmission and reception devices and system, data transmission method, and parameter setting method for a data reception device, according to the invention will be explained in detail.

Preferably, the present invention may be applied to a digital satellite broadcasting system which, for example, is based upon the MPEG2 encoding convention, but which may be based upon other encoding conventions and protocols. The satellite broadcasting station of the system includes a satellite broadcasting transmission device, indicated generally at 10 and configured as shown in FIG. 8, by way of example.

Figure 8:
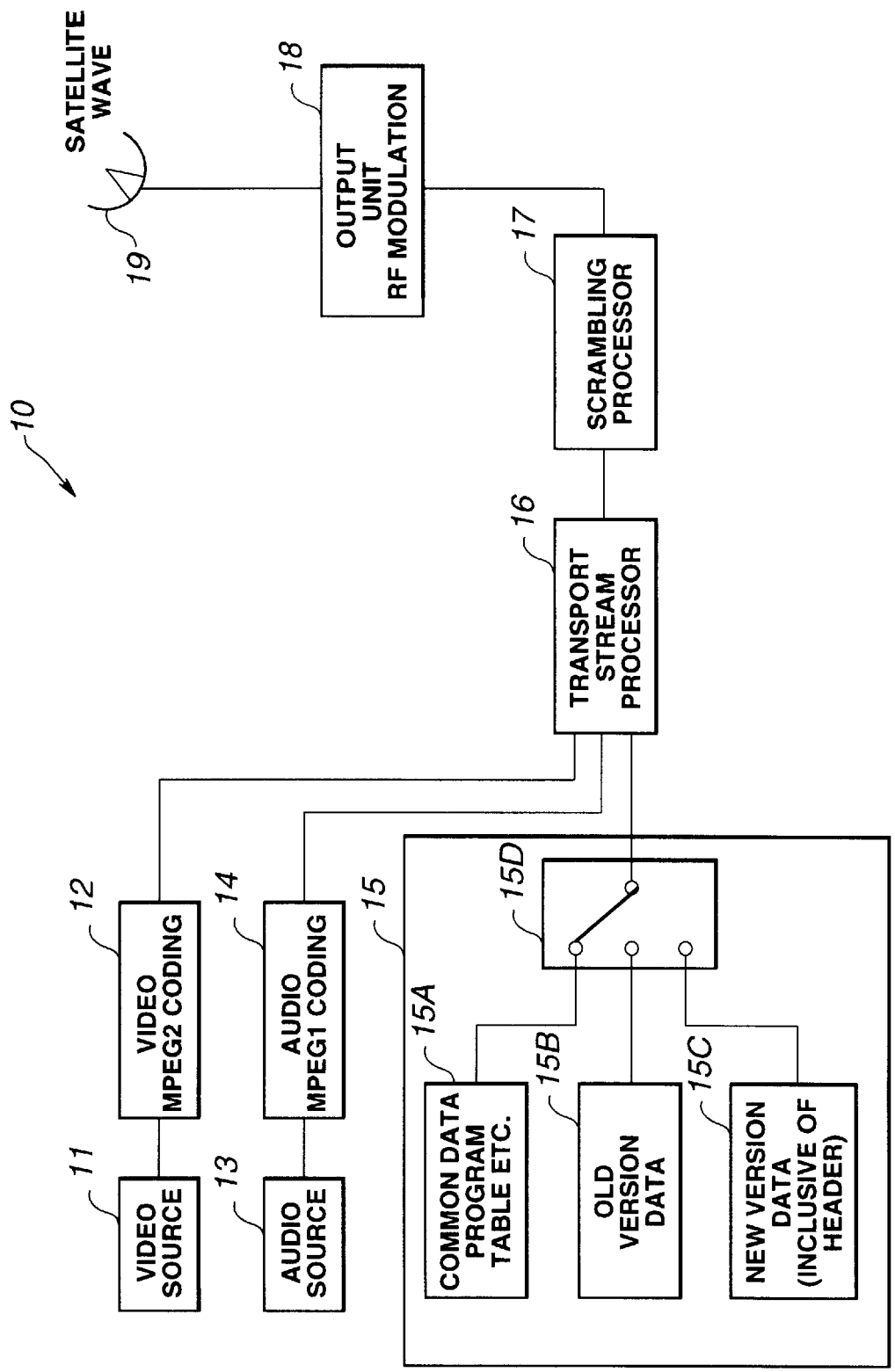
FIG. 8 is a block diagram depicting the structure of a transmission device of a satellite broadcasting station in a digital satellite broadcasting system constructed in accordance with the invention.

Satellite broadcasting transmission device 10, as shown in FIG. 8, includes an MPEG2 encoder 12 supplied with video data from a video data generator or video source 11, an MPEG1 encoder 14 supplied with audio data from an audio data generator or audio source 13, and an additional control data generator 15 for generating control data. This generated control data may include, by way of example, additional data such as a program table or control data for the control of various system hardware. Satellite broadcasting transmission device 10 also includes a transport stream processor 16 supplied with output data from MPEG2 encoder 12, MPEG1 encoder 14 and additional control data generator 15. A scrambler 17 is supplied with output data from transport stream processor 16 and a transmitter output unit 18 is supplied with output data from scrambler 17 for transmission to a broadcasting antenna 19.

MPEG2 encoder 12 encodes the video data supplied from video data generator 11 in a highly efficient manner in accordance with the algorithm prescribed by the MPEG2 convention for generating compressed video data. The compressed video data generated by the MPEG2 encoder is supplied to transport stream processor 16.

MPEG1 encoder 14 encodes the audio data supplied from audio data generator 13 in a highly efficient manner in accordance with the algorithm prescribed by the MPEG1 convention for generating compressed audio data; and this compressed audio data is also supplied to the transport stream processor.

Additional control data generator 15 operates as a parameter setting data generator by generating appropriate parameter setting data for various hardware items, which may be of various hardware versions, used in the satellite receiver. Additional control data generator 15 includes a first additional control data generating unit 15A for generating data such as program table or control data common to all hardware versions. The additional control data generator also includes a second additional control data generating unit 15B for generating control data for hardware of a first, older version and a third additional control data generating unit 15C for generating control data for hardware of a second, newer version. A selection unit 15D is provided for switching between additional control data generating units 15A to 15C to obtain the respective control information in accordance with a pre-set transmission sequence. Thus the required control information is output from additional control data generator 15 in the proper sequence. While this additional control data includes parameters for two hardware versions in this preferred embodiment, parameters for any number of hardware versions may be provided by employing additional control data generating units.

The additional-control data, generated by additional control data generator 15, is supplied to transport stream processor 16 which converts compressed video data generated by MPEG2 encoder 12, compressed audio data generated by MPEG1 encoder 14 and additional control data generated by additional control data generator 15 into bit stream data which is routed to scrambler 17.

Scrambler 17 encrypts the bit stream data supplied from transport stream processor 16 and forms the resulting scrambled bit stream data into a data packet. Transmitter or output unit 18 modulates a carrier wave with the data packet from scrambler 17 and broadcasts the data packet signal via broadcasting antenna 19 as a satellite wave to a broadcasting satellite.

Thus, it is seen that transport stream processor 16, scrambler 17 and transmitter 18 operate as a transmission apparatus for transmitting additional control data generated by additional control data generator 15. This additional control data includes at least specific parameter setting data for various hardware items of more than one hardware version.

The data stream for digital satellite broadcasting may carry various additional control data, such as program table data, key decoding information for descrambling and copy protect signal parameters, along with compressed video and audio data as shown in FIG. 9A. In accordance with the invention, a header may be appended to the leading end of the additional control data, as shown in FIG. 9B. This header may include information for discriminating (or identifying) the hardware version of a particular item of hardware to be controlled. By having this discriminating data carried in the header in the additional control data generated by additional control data generator 15, it is possible for the broadcasting satellite receiver to read and utilize only the data from the broadcast signal corresponding to its hardware version.

However if the broadcast system hardware is of an older version, it might not be able to transmit new hardware data by employing a leading header, as described above. In order to overcome this problem, if it is necessary to transmit newer hardware information along with the original older hardware signal, as is shown in FIG. 9C, the older control information is transmitted first in the normal manner, and then the data for the newer hardware versions is transmitted in the second portion of the signal, which was previously unused by the older hardware (e.g. the "allowance; void bit's" of FIG. 9A). A header may be included within the newer data, which may include further instructions for utilization of the additional data, or the header may be omitted. In this manner, an older broadcasting system can transmit newer hardware information without disrupting the transmission of the older hardware information. Thus, each hardware version can read the appropriate data, the older hardware version only sensing the beginning of the signal and the newer hardware version being programmed to sense only the later portion of the signal.

In order to form such a data stream, additional data selection unit 15D of additional control data generator 15 of transmission device 10 is adapted to select and place data including a program table generated by first additional control data generating unit 15A and control data for use with an older hardware version generated by second additional control data generating unit 15B in the first portion of the data stream. Additional control data selection unit 15D then selects and places control data generated by third control data generating unit ISC in the second portion of the signal for use by the newer satellite receiver hardware version.

If only a portion of the transmitted data is for an old or new hardware version exclusively, and the remainder of the data is to be used by both the old and new hardware versions, the data scheme as shown in FIG. 9D can be used. Data which is common to an old hardware version and a new hardware version is sent in a first signal area, and recognized by both the old version and new version hardware. Thus, data to run hardware items common to each of the respective versions is transmitted. Then, additional control data for only particular specified functions or hardware items is sent in what otherwise is the additional reserved (undefined) area. This additional control data includes a header for discriminating the hardware version to which the additional data applies. Thus, each broadcasting satellite receiver extracts only the data corresponding to its version. Thus this additional data may contain information only for the new version, or for both the old and new version, as described in the header portion of the data. Accordingly, the entire data for different versions of the satellite broadcasting receiver need not be sent if portions of the data would be identical, and only the different data for each hardware version need be sent in addition to the common information.

To form the data stream of FIG. 9D, additional control data selection unit 15D of additional data generator 15 of transmission device 10 sequentially selects, in accordance with the above-mentioned transmission sequence, data generated as additional control data by first additional control data generating unit 15A, such as the program table, control data common to each of the hardware versions generated by second additional control data generating unit 15B, and control data for the new (or old, if necessary) hardware version generated as third additional control data by third additional control data generating unit 15C.

FIGS. 10A to 10D, 11A and 11B depict different formats of the structure of the data stream as transmitted, with particular reference being made to the copy protect signal in order to differentiate between the data streams, by way of example.

An old version copy protect signal is assumed to comprise a 64-bit data word. For an old hardware version,, byte N[0] of this data word performs on/off controls for various hardware items and byte N[7] of this data word sets the number of inverted lines of the color stripe, as shown in FIG. 10A. This corresponds, for example, to the additional information data in the data stream of FIG. 9A.

The example shown in FIG. 10B corresponds to the data stream in FIG. 9B. Here, a 4-bit header is added to the leading end of the 64-bit parameter setting (or copy protect) data word. The example shown in FIG. 10C corresponds to the data stream in FIG. 9C, where the 4-bit header is positioned after the 64-bit parameter setting data word containing data for the old hardware version and before a 132-bit parameter setting data word which contains data for the new hardware version. The example shown in FIG. 10D corresponds to the data stream in FIG. 9D, where the 132-bit parameter setting data word containing data for the new hardware version is positioned after the 64-bit parameter setting data word containing data for the old hardware version.

An additional example of a parameter setting data word is shown in FIG. 11A. In this example, on/off control for hardware of a new version is performed by commands in the N[0] byte of the signal. While certain bits, such as bit 3, of this N[0] byte are used for on/off control in the parameter setting data for the old version, other bits, such as bit 7, in this byte can be used to control the new hardware version, since the old hardware will not try to read these bits. Thus, the on/off control function for each hardware version is controlled independently. By controlling the on/off control function independently for the old and new versions, the line number data representing those lines that are controlled in the color stripe copy protection scheme can be turned on for the new hardware version and off for the old hardware version so as not to output the color stripes in the old hardware version and thus avoid unwanted interference.

A further example shown in FIG. 11B sends line number data for the new hardware version after the line number data for the old hardware version inasmuch as line number data transmitted in the latter portion of the parameter setting data word is ignored by the old hardware version. The new hardware version satellite broadcasting receiver senses the color number data line stored at byte N[7'] and uses this line number data in place of the old hardware version line number data stored at byte N[7] in order to control the copy protection signal generator.

Figure 12:
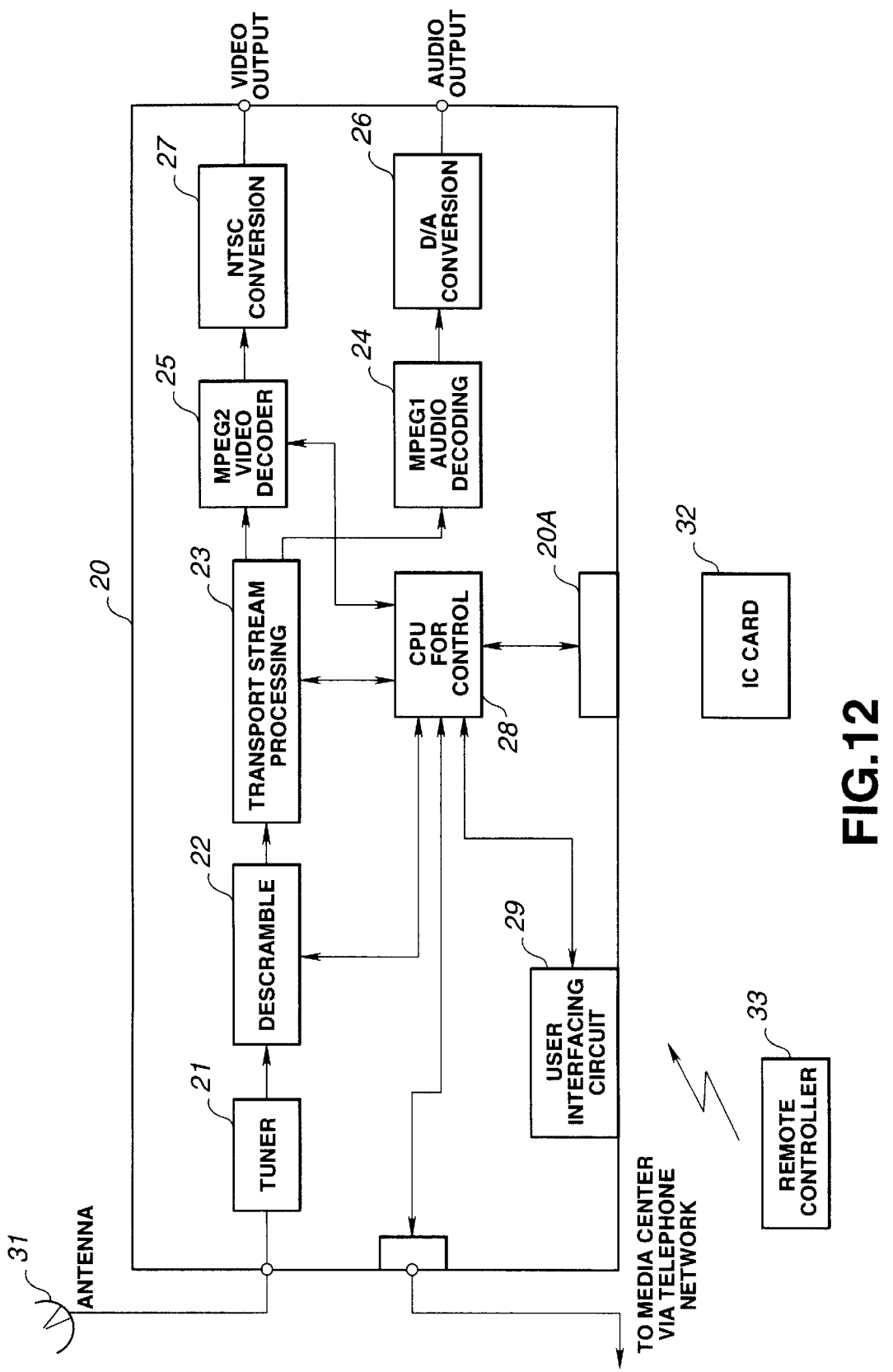
FIG. 12 is a block diagram depicting the structure of a satellite broadcasting receiver utilized in conjunction with the digital satellite broadcasting station of FIG. 8.

FIG. 12 depicts a satellite broadcasting receiver 20 constructed in accordance with the invention and adapted for receiving digital satellite broadcasting sent from the above-described satellite broadcasting transmitting device 10 via a broadcasting satellite. Satellite broadcasting receiver 20 comprises a tuner 21, a descrambler 22, a transport stream processor 23, an MPEG1 audio decoder 24, an MPEG2 video decoder 25, an audio outputting signal processor (D/A converter) 26, a video outputting signal processor (D/A converter) 27, a controller 28 and a user interfacing circuit 29.

Tuner 21 processes satellite broadcasting signals received via a satellite broadcasting receiving parabolic antenna 31. The received signal undergoes receiving transponder switching, demodulation or error correction and is fed from tuner 21 to descrambler 22. The descrambler uses key decoding information, which is supplied via controller 28 from an integrated circuit (IC) card 32 loaded in an IC card slot 20A, for descrambling. The descrambled data stream is then forwarded to transport stream processor 23 which extracts the video and audio data from the data stream based upon program specific information, corresponding to the station selected by the viewer, as obtained by controller 28 from remote controller 33 via user interfacing circuit 29. The audio data extracted by transport stream processor 23 is sent to MPEG1 decoder 24, while the video data which is extracted is sent to MPEG2 decoder 25. Transport stream processor 23 also extracts the additional control data from the transport stream and routes the extracted additional control data to controller 28.

MPEG1 decoder 24 decodes the audio data sent from transport stream processor 23 in accordance with an algorithm prescribed in accordance within the MPEG1 convention for converting compressed audio data into uncompressed audio data. The uncompressed audio data, supplied from the MPEG1 decoder, is routed to audio outputting signal processor 26 which D/A converts the uncompressed audio data into analog audio signals.

MPEG2 decoder 25 decodes the video data sent from transport stream processor 23 in accordance with the algorithm prescribed in accordance with the MPEG2 convention for converting compressed video data into uncompressed video data. The uncompressed video data is routed to video outputting signal processor 27.

Figure 13:
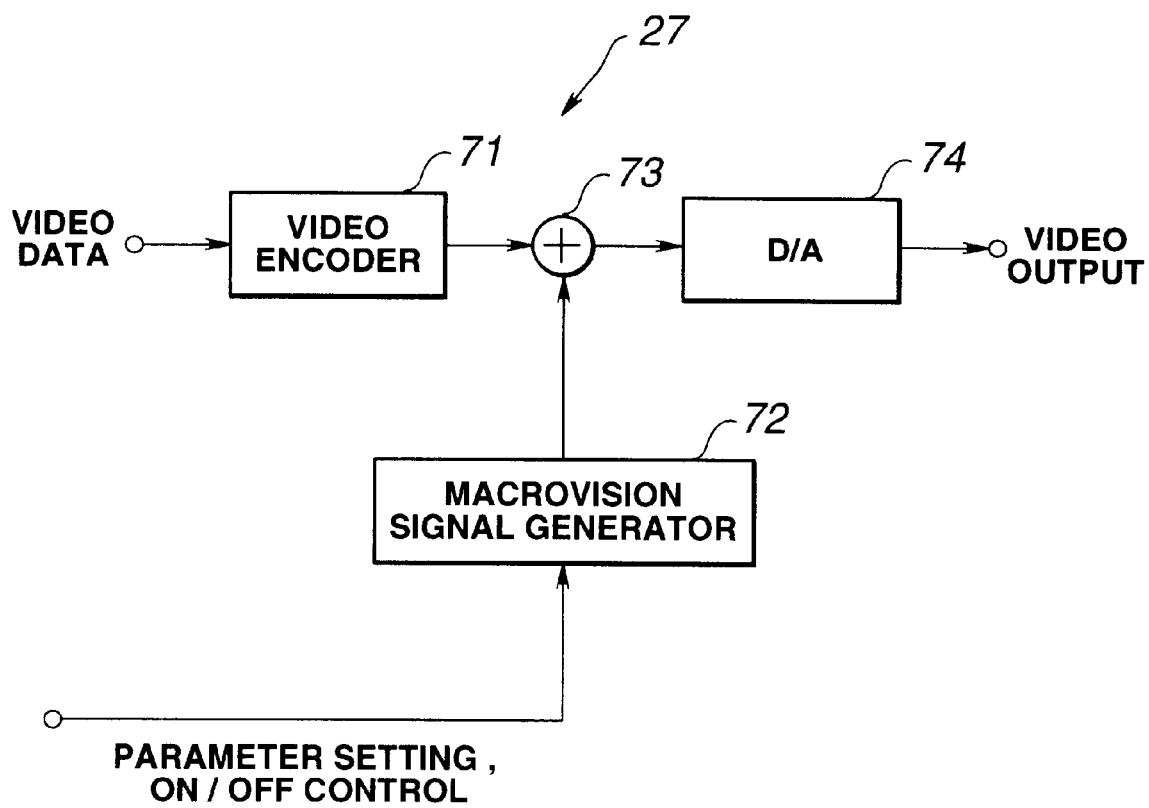
FIG. 13 is a block diagram depicting the structure of a video outputting signal processor of the satellite broadcasting receiver of FIG. 12.

As is further shown in FIG. 13, video outputting signal processor 27 further comprises a video encoder 71, a copy protection signal generator 72, an adder 73 and a D/A converter 74. The video data furnished from MPEG2 decoder 25 is converted by video encoder 71 into video data conforming to a pre-set standard for a particular television system, such as the NTSC system, by way of example. This data is subsequently D/A converted by D/A converter 74 and is outputted as analog video signals conforming to the pre-set television system standard. In addition, a copy protect signal generated by copy protection signal generator 72, which is controlled by controller 28 (FIG. 12), is added by adder 73 to the video data output from video encoder 71.

Figure 14:
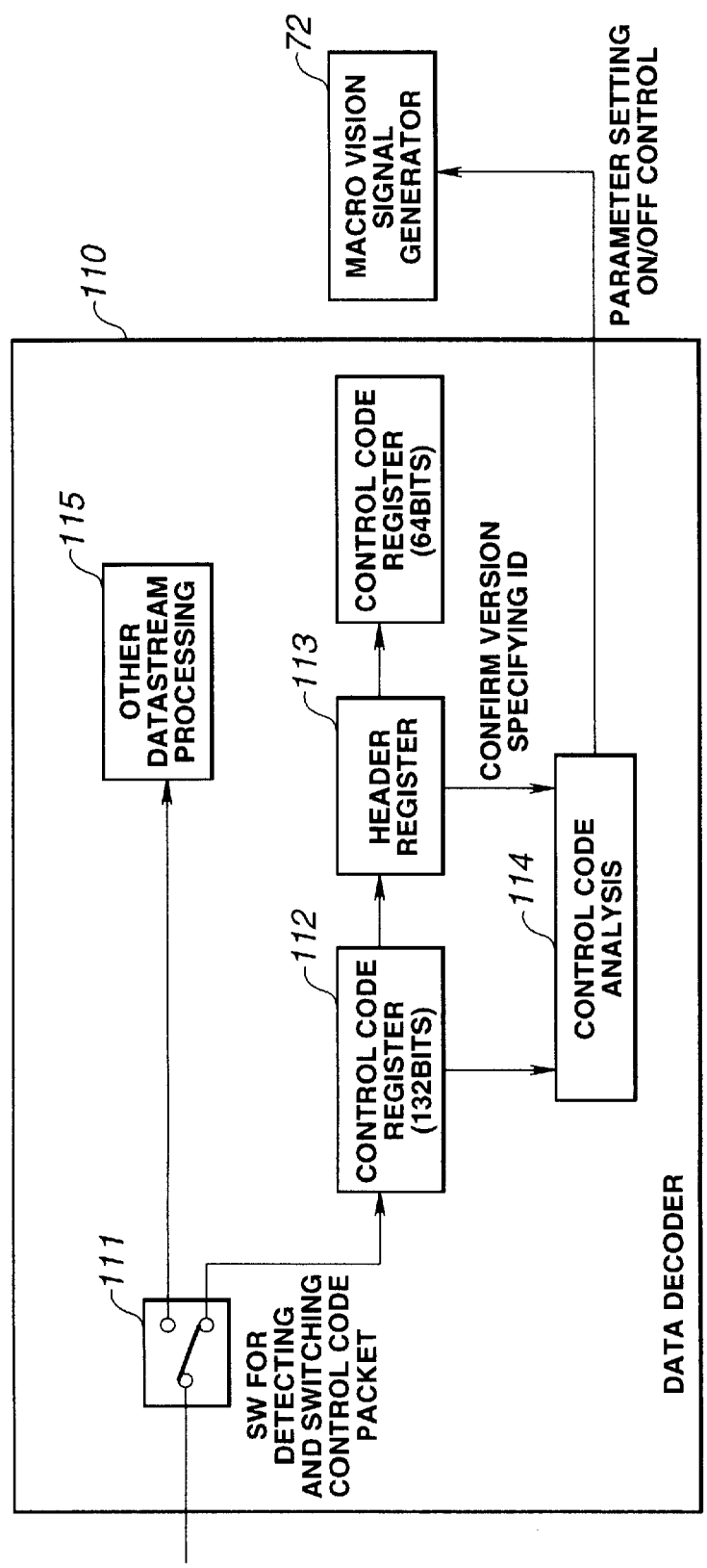
FIG. 14 is a block diagram depicting an illustrative structure of a data decoder in a controller of the satellite broadcasting receiver shown in FIG. 12.

As is shown in FIG. 12, controller 28 in satellite broadcasting receiver 20 performs the function of decoding the additional control data extracted by transport stream processor 23. This additional control data may contain instructions for performing control operations, such as program table display control or copy protection control operations. This data decoding function is implemented by a data decoder 110 contained within controller 28, a first preferred embodiment thereof being constructed as is shown in FIG. 14. The data decoder comprises a control code register 112, preferably capable of storing 132 bits, and a header register 113, preferably capable of storing 4 bits, each being formed as a shift register. Data decoder 110 extracts a 4-bit header and a 132-bit control code from the additional control data and places same into header register 113 and control code register 112, respectively. On detecting a control code packet, a switch 111 is changed over from a pass through position allowing data to bypass these registers to a position in which data is directed to these registers. After being placed in the proper registers, the control code of the additional control data is analyzed by a control code analyzer 114 in order to effect on/off control and parameter setting for copy protection signal generator 72. The data other than this control code is allowed to bypass these registers, as is noted above, and is furnished via switch 111 to an other data stream processor 115 where this information, which may comprise the program table, for example, is extracted and displayed.

Data decoder 110 is a new hardware item and is therefore adapted to function with a control code containing instructions for a new hardware version. The 64-bit parameter setting data contained in a data string, such as that shown in FIG. 10D, is expanded to 132 bits. The new 4-bit header, stored in register 113, is used for analyzing the new 132-bit control code stored in control code register 112. Data decoder 110 is also adapted to function with the control code shown in FIG. 10c, wherein the new 4-bit header, which follows the old 64-bit control code, stored in the header register and is used by control code analyzer 114 to analyze the new hardware version data stored in register 112. Thus, data decoder 110 can perform decoding associated with either of the new hardware data strings shown in FIGS. 9B and 9C (or 10B and 10C).

Figure 1:
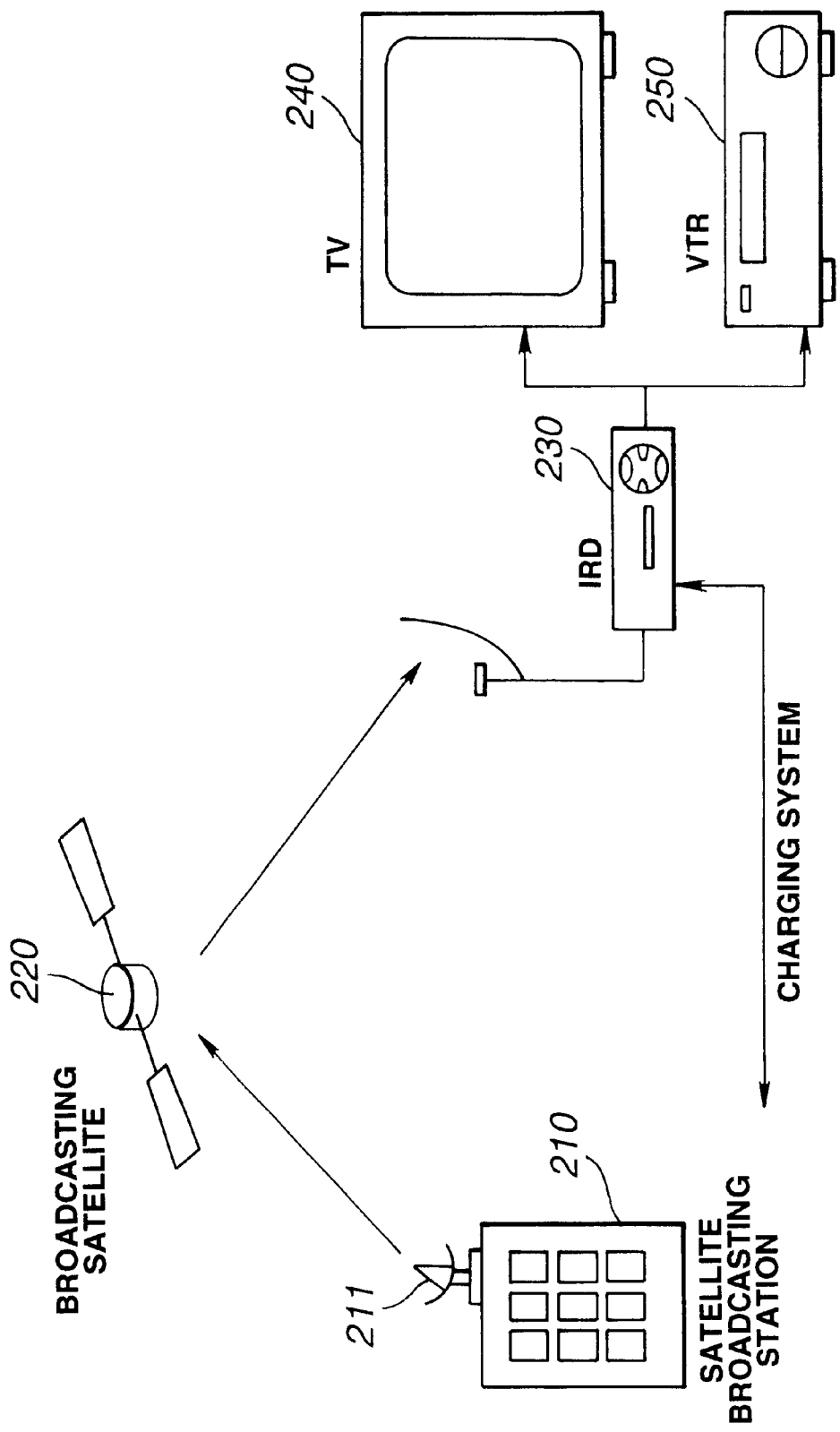
FIG. 1 is a block diagram depicting the structure of a digital satellite broadcasting system.
Figure 2:
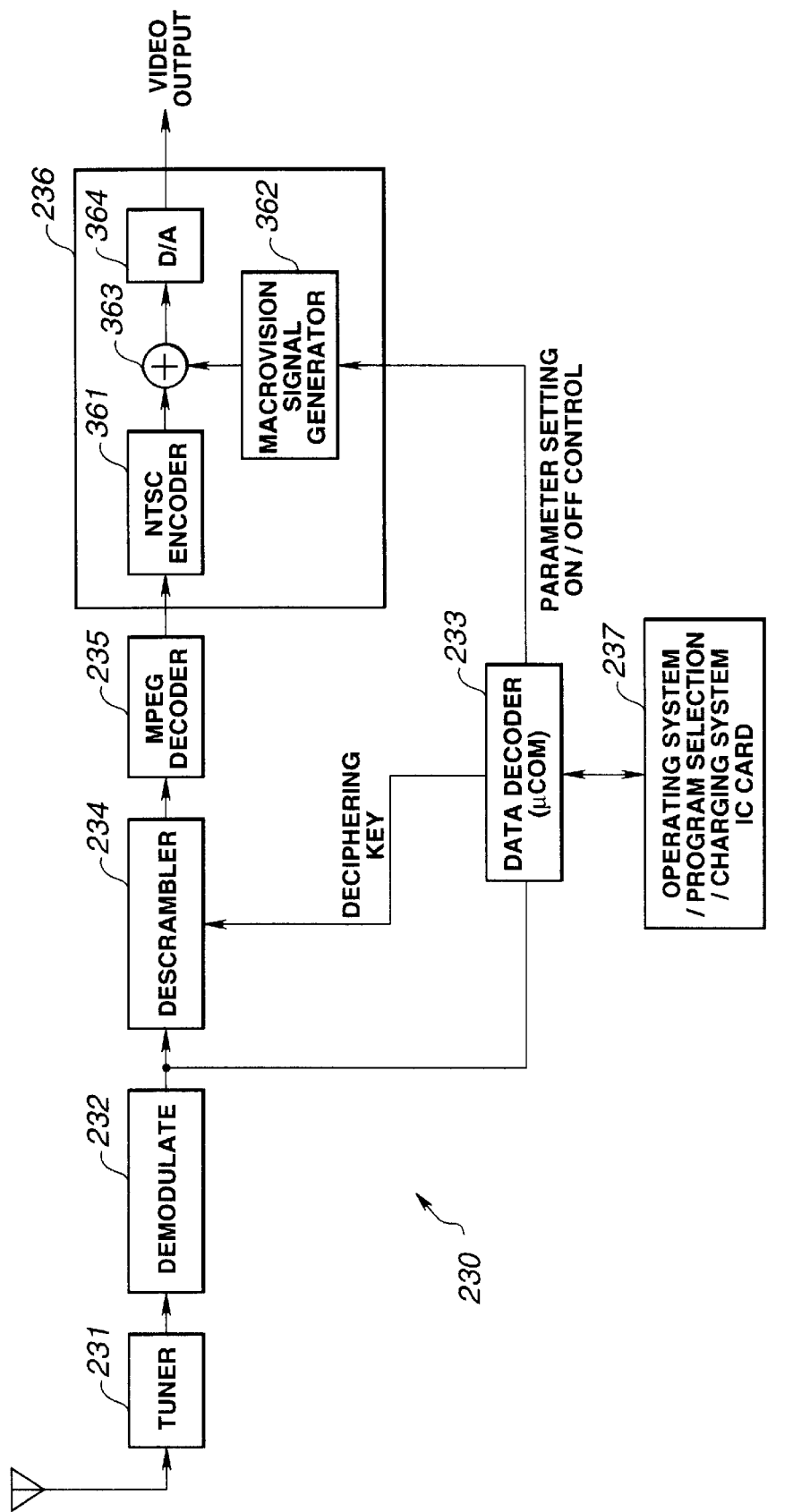
FIG. 2 is a block diagram depicting the structure of a satellite broadcasting receiver.
Figure 3:
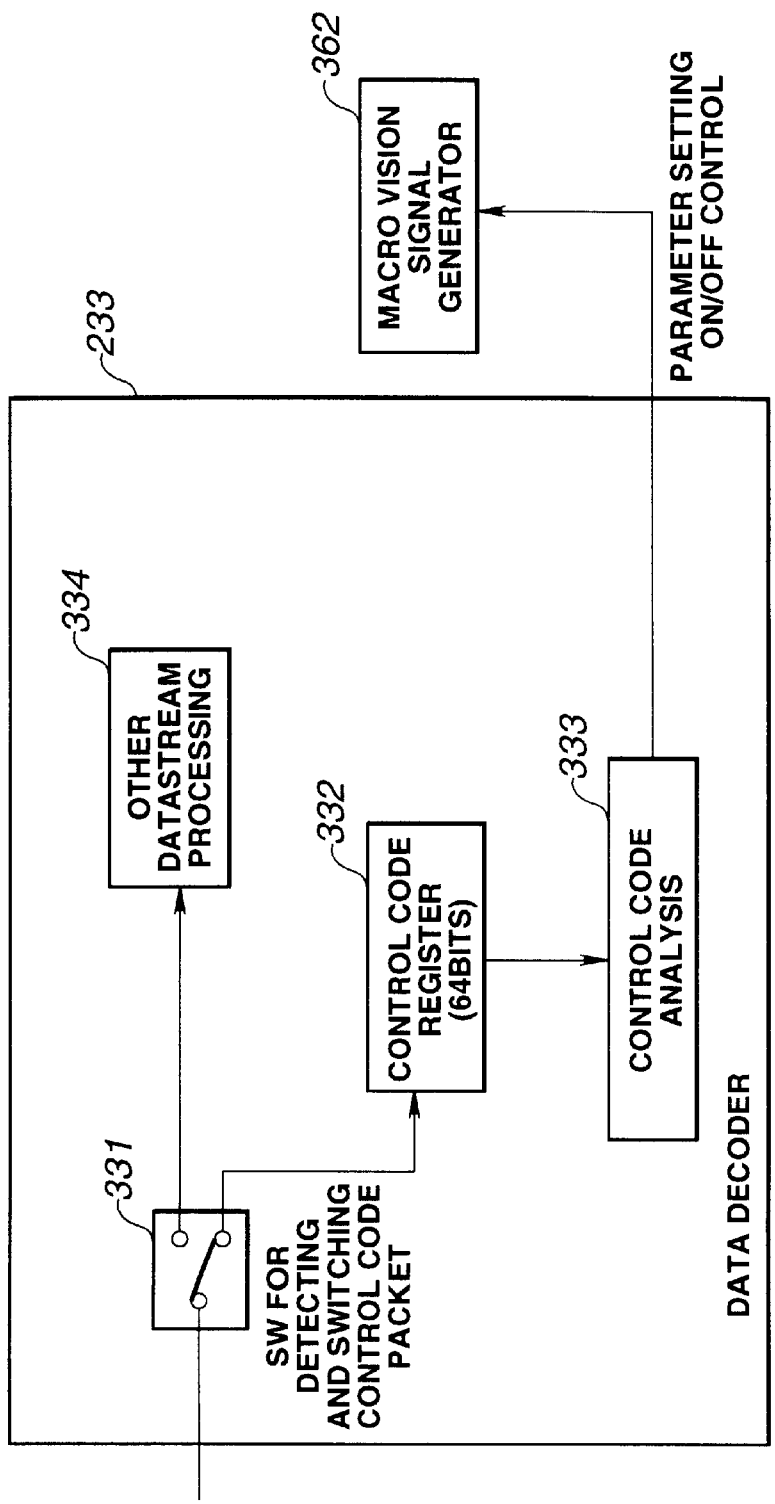
FIG. 3 is a block diagram depicting the structure of a data decoder contained within the satellite broadcasting receiver of FIG. 2.
Figure 4:
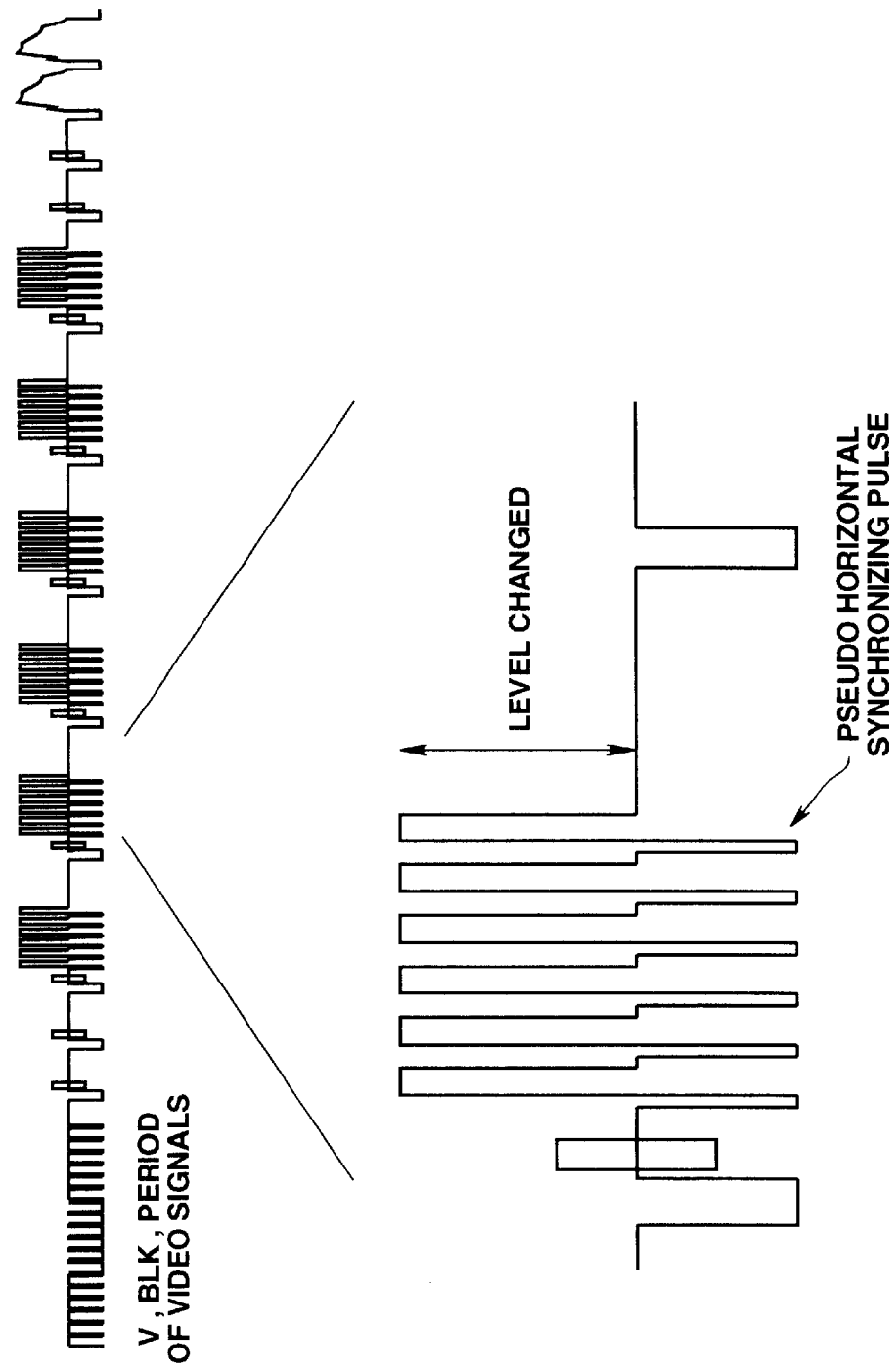
FIG. 4 illustrates a pseudo synchronization pulse copy protect signal.
Figure 5:
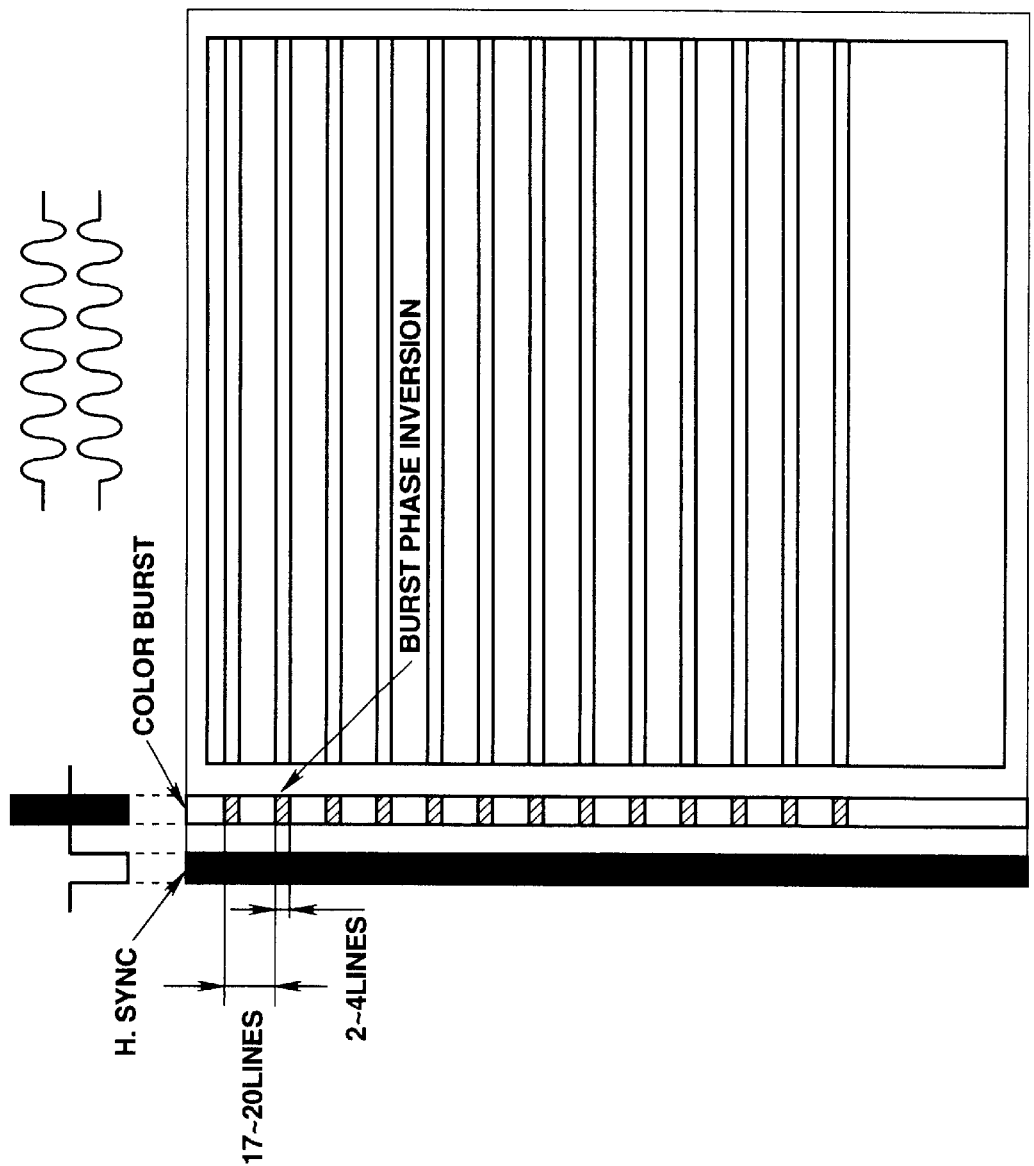
FIG. 5 illustrates an older version of a color stripe copy protection system.
Figure 6:
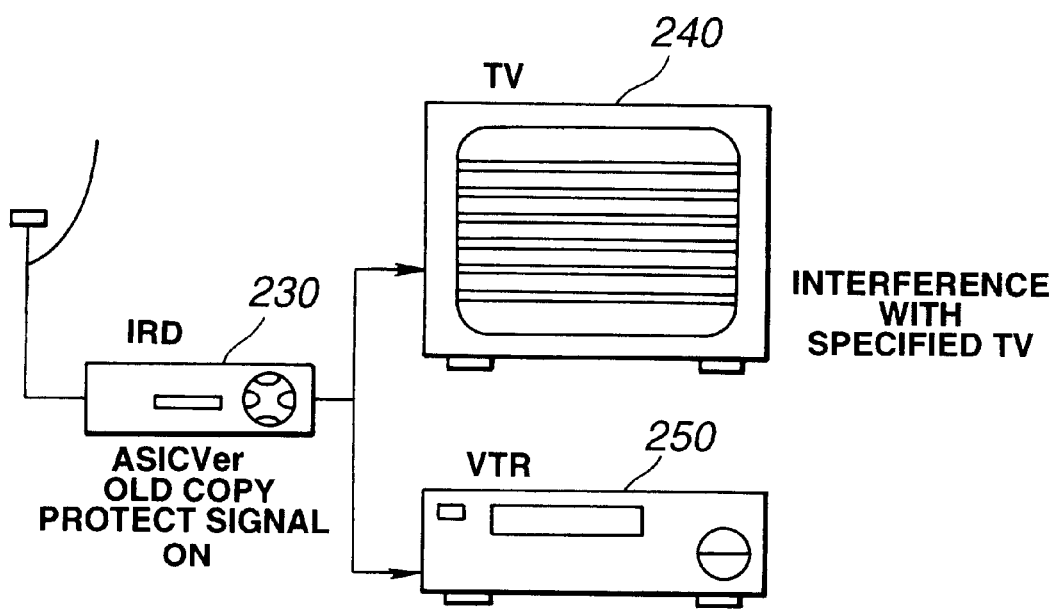
FIG. 6 illustrates interference that may be caused by the color stripe copy protection system.
Figure 7:
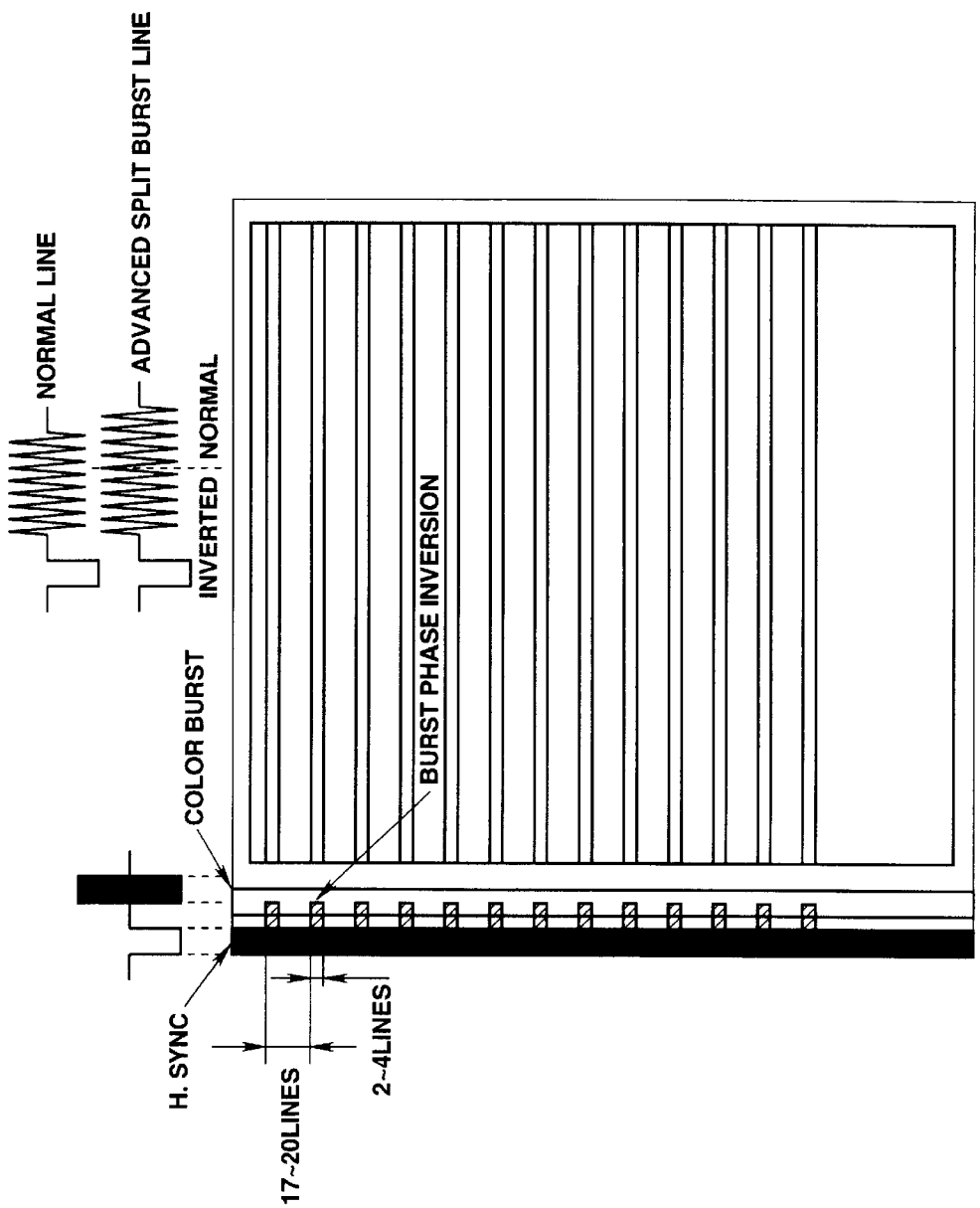
FIG. 7 illustrates a newer version of the color stripe copy protection system.

Alternatively, when the data stream shown in FIG. 9B, which corresponds to the data string in FIG. 10B, is processed by an old hardware version, as shown in FIG. 3, only the control code portion containing the old hardware version data (64 bits) is stored in control code register 332 of data code decoder 233. However, as is shown in FIG. 14, when a new hardware version reads this data string, the header and the control code are loaded into header register 113 and control code register 112, respectively. Similarly during processing of the data string shown in FIG. 9C (and 10C), in the old hardware version, as shown in FIG. 3, only the control code portion containing the old hardware version data (64 bits) is stored in control code register 332 of data code decoder 233. However, as is shown in FIG. 14, when a new hardware version reads this data, the 4-bit header and following data are stored in header register 113 and control code register 112, respectively. Thus, the newer hardware versions are able to extract the control data for the newer hardware versions, while the older hardware versions are able to utilize the older hardware version data without being affected by the additional control data.

Figure 15:
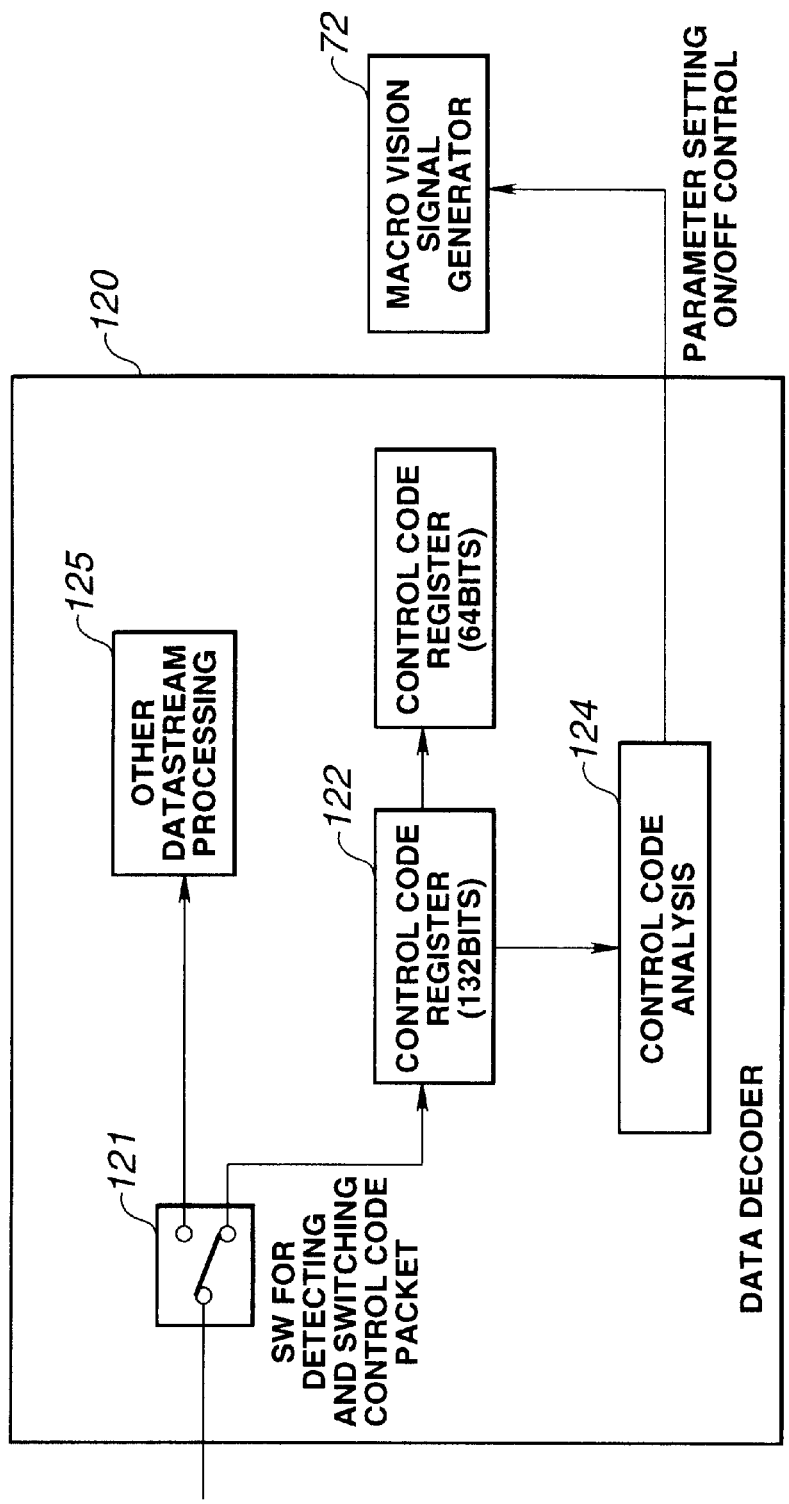
FIG. 15 is a block diagram depicting an additional illustrative structure of a data decoder that may be used in the controller of the satellite broadcasting receiver of FIG. 12.

Control codes, which are formed as the data string shown in FIG. 10D, are processed by a data decoder 120, configured as is shown in FIG. 15. This control code includes 64-bit old hardware version parameter setting data followed by 132-bit new hardware version parameter setting data. The data decoder shown in FIG. 15 is a new version of hardware, and comprises a control code register 122, formed as a shift register, and capable of storing a 132-bit control code. The 132-bit control code is placed therein via a switch 121, which functions similarly to switch 111, described above. Once in control code register 122, a control code analyzer 124 analyzes the 132-bit control code to effect on/off control and parameter setting for copy protection signal generator 72. Switch 121 sends data other than the control codes to other data stream processor 125, which is similar to processor 115, noted above.

When the data string shown in FIG. 10D is transmitted and read by an older version of hardware, only the leading 64 bit parameter setting data (i.e., the "old version data") is stored in control code register 332 of data decoder 233 (FIG. 3). The trailing 132-bits of data (i.e., the "new version data") are disregarded. However, when a new hardware version data decoder 120 (FIG. 15) is used, the leading 64 bit old hardware version parameter setting data is disregarded, and only the trailing 132-bit new hardware version parameter setting data is loaded into control code register 122. Thus, each hardware version is able to extract the appropriate code for its version from the received control data.

Figure 16:
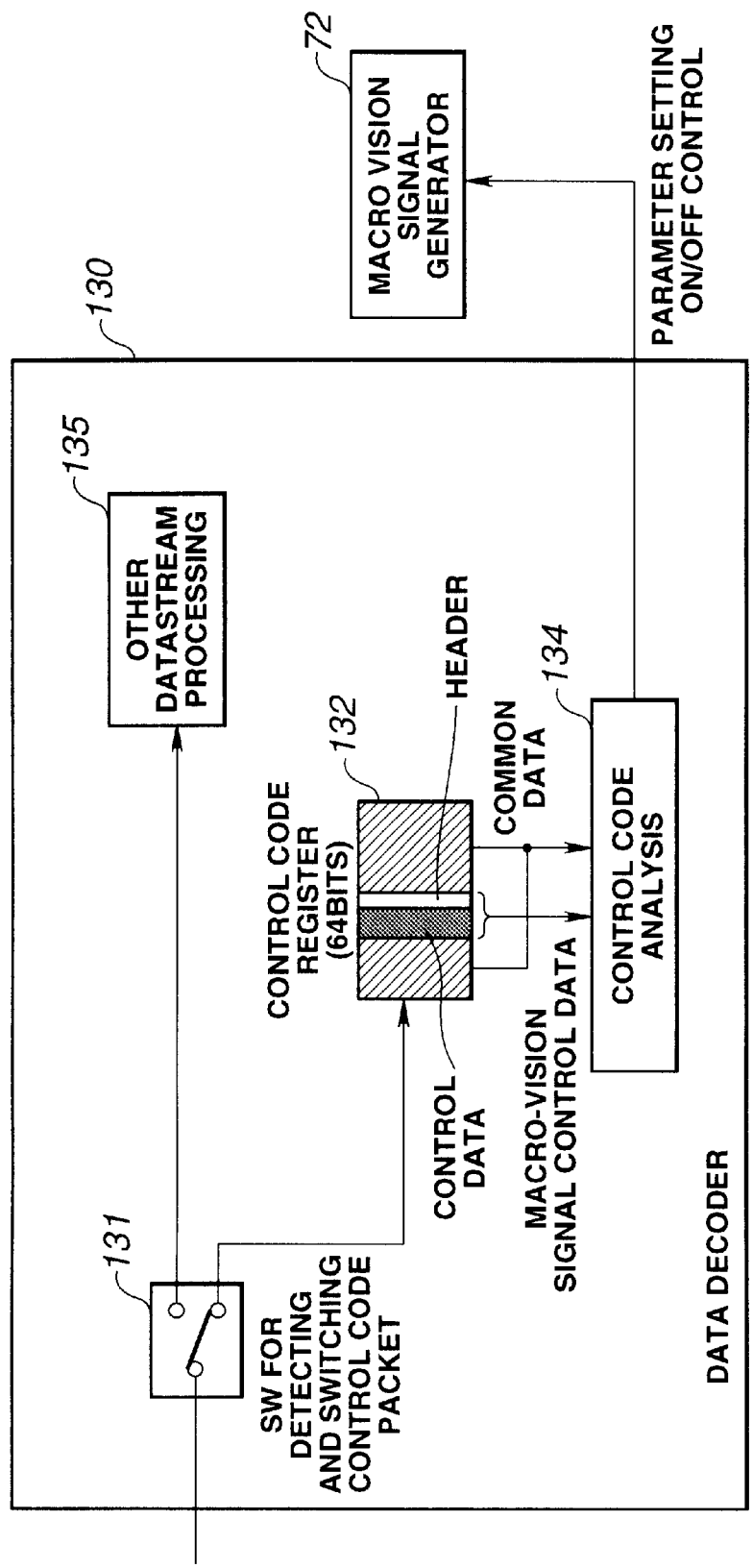
FIG. 16 is a block diagram depicting yet another illustrative embodiment of a data decoder that may be used in the controller of the satellite broadcasting receiver of FIG. 12.

If a data stream such as that shown in FIG. 9D is transmitted, a data decoder 130, configured as shown in FIG. 16, may be used. Data decoder 130 is a new hardware version, and includes a control code register 132, formed as a shift register, adapted to store a 64-bit control code supplied thereto via a switch 131 which operates similarly to switches 121 and 111. Data other than the control code, such as the information for the program table, is sent via switch 131 to an other data stream processor 135 which extracts such information.

Thus, when a data stream such as that shown in FIG. 9D is transmitted, and is read by an older hardware version data decoder 233 (FIG. 3), the 64-bit control code containing the old hardware version data (and which may also be common to the new hardware aversion) is stored in control code register 332 and the data containing the new hardware version information is disregarded. Thus, only the control codes common to the old and new hardware versions are utilized. However, when new hardware version data decoder 130 is used (FIG. 16), both the information for the old hardware version and the information for the new hardware version are extracted from the control code register 132.

FIGS. 11A and 11B contain data strings which correspond to the data stream of FIG. 9D. When the data string shown in FIG. 11A is transmitted, data decoder 233 from the old version hardware reads the data string, disregards bit 7 of the N[0] byte of the data string as an undefined bit, and performs on/off control of color stripe copy protection based upon bit 3 of the N[0] byte. However, when this data string is supplied to data decoder 130 (FIG. 16) which is a new hardware version, the data decoder performs on/off control of color stripe copy protection based upon bit 7 of the N[0] byte of the data string. By controlling the on/off control function independently for the old and new hardware versions, phase inversion of the burst signal in the four color stripe lines can be turned off by bit 3 when using an old hardware version to avoid interference.

Figure 17:
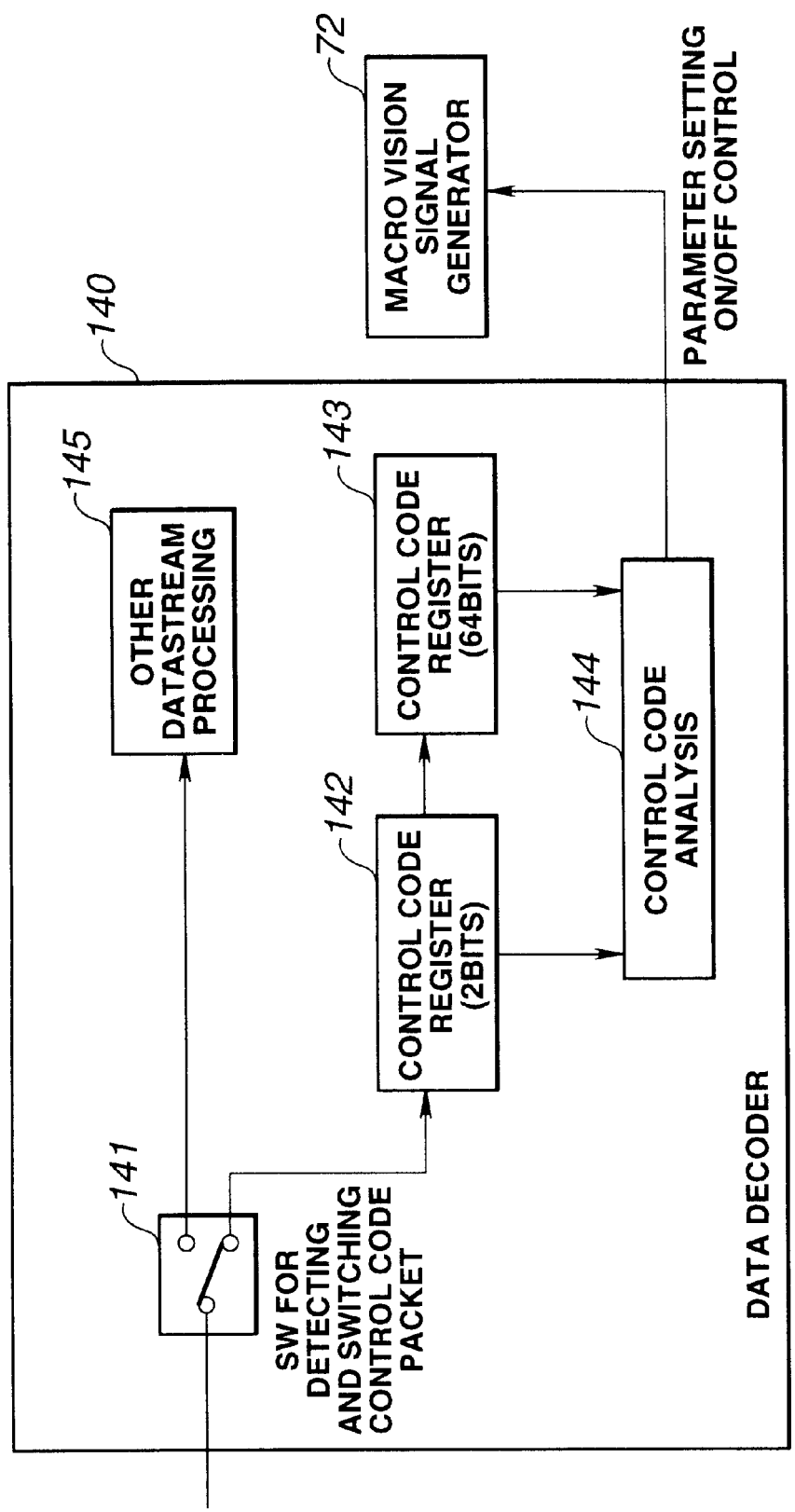
FIG. 17 is a block diagram depicting a further illustrative structure of a data decoder that may be used in the controller of the satellite broadcasting receiver of FIG. 12.

When the data string shown in FIG. 11B is transmitted, a data decoder 140, configured as shown in FIG. 17 may be used. This data decoder comprises a control code register 143 adapted to store 64 bits and an expansion register 142 adapted to store 2 bits, both formed as shift registers. The expanded 2-bit parameter setting data and the 64-bit parameter setting data are supplied to expansion register 142 and control code register 143, respectively, via a switch 141 which functions similarly to switches 131, 121 and 111 noted above. The data in these registers are analyzed by a control code analyzer 144 in order to effect on/off control and parameter setting for the copy protection signal generator 72. Data other than the control code is supplied by switch 141 to an other data stream processor 145, similarly as noted above.

When the data string of FIG. 11B is transmitted and read by an older hardware version, the expanded 2-bit parameter setting data of byte N[7'] is disregarded by data decoder 233 (FIG. 3) while the 64-bit parameter setting data is placed in control code register 332 and bit 3 is sensed to control the color stripe copy protection operation. However, when a new hardware version data decoder 140 (FIG. 17) is used to receive the data string, the 2 bits in byte N[7] of the 64-bit parameter setting data placed into control code register 143 are disregarded, and the 2-bit parameter setting data of byte N[7'] taken from the expansion register 142 are used to perform parameter setting of the copy protection signal generator 72. Thus proper control can be assured.

Thus, in each embodiment of the invention, both old and new hardware versions will receive the proper control data in order to operate properly.

It will thus be seen that the objects set forth above, among those made apparent from the preceding description, are efficiently attained and, since certain changes may be made carrying out the above method and in the constructions set forth without departing from the spirit and scope of the invention, it is intended that all matter contained in the above description and shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

What is claimed is:

1. A data transmitting method, comprising the steps of:
generating parameter setting data for various items of hardware, at least two of said various items of hardware comprising different versions, and expecting to receive data in different formats:
embedding a first of said parameter setting data into one or more control codes in a data format and in a portion thereof recognized by said at least two of said various items of hardware;

embedding a second of said parameter setting data into said one or more control codes in a data format recognized by said at least two of said various items of hardware, but in a portion thereof recognized by only one of said at least two of said various items; and transmitting said one or more control codes including said parameter setting data.

2. The data transmitting method of claim 1, wherein said first of slid parameter setting data and said second of said parameter setting data set parameters for hardware of a plurality of hardware versions.

3. The data transmitting method of claim 1, further comprising the steps of:

generating parameter setting data common to hardware items of at least first and second hardware versions;

generating parameter setting data for only specified functions for hardware items of said first hardware version; and generating parameter setting data for only specified functions for hardware items of at least said second hardware version.

4. The data transmitting method of claim 1, further comprising the steps of:

generating discrimination data for discriminating between a plurality of hardware versions; and embedding said discrimination data as a header of said parameter setting data.

5. The data transmitting method of claim 4, further comprising the steps of:

generating parameter setting data common to hardware items of at least first and second versions;

generating parameter setting data for only specified functions for hardware items of said first hardware version; and generating parameter setting data for only specified functions for hardware items of at least said second hardware version.

6. The data transmitting method of claim 5, wherein hardware items of said first hardware version read said common parameter setting data as well as said parameter setting data; for said first hardware version and ignore said parameter setting data for said second hardware version; and hardware items of said second hardware version read said common parameter setting data as well as said parameter setting data for said second hardware version and ignore said parameter setting data for said first hardware version.

7. The data transmitting method of claim 6, wherein said hardware items of said first and second hardware versions utilize said discrimination data for determining which of said parameter setting data to read.

8. The data transmitting method of claim 1, wherein said parameter setting data further comprises at least:

parameter setting data for hardware items of a first hardware version; and parameter setting data for hardware items of a second hardware version;

wherein hardware items of said first hardware version read said parameter setting data for said first hardware version and ignore said parameter setting data for said second hardware version; and hardware items of said second hardware version read said parameter setting data for said second hardware version and ignore said parameter setting data for said first hardware version.

9. A data transmission device, comprising:

a parameter setting data generator for generating parameter setting data for various items of hardware, at least two of said various items of hardware comprising different versions, and expecting to receive data in different formats; and a transmitter for transmitting a control code including said parameter setting data, a first of said parameter setting data being embedded into said control code in a data format, and in a portion thereof recognized by said at least two of said various items of hardware, a second of said parameter setting data being embedded into said control code in a data format recognized by said at least two of said various items of hardware, but in a portion thereof recognized b only one of said at least two of said various items.

10. The data transmission device of claim 9 wherein said parameter setting data includes at least parameters for hardware of at least first and second hardware versions.

11. The data transmission device of claim 10 wherein said parameter setting data generator further generates discrimination data for discriminating between said at least two hardware versions;

said discrimination data being included as a header in said control code.

12. The data transmission device as claimed in claim 11, further comprising:

a common parameter setting data generator for generating a portion of said parameter setting data which is common to the hardware items of said at least two hardware versions;

wherein said parameter setting data includes said portion which is common to all hardware items of said at least. two hardware versions, as well as parameter setting data for said first hardware version and parameter setting data for said second hardware version.

13. The data transmission device of claim 12, wherein hardware items of said at least two hardware versions utilize said discrimination data for determining which parameter setting data to read.

14. The data transmission device of claim 9, further comprising:

a common parameter setting data generator for generating a portion of said parameter setting data common to said various items of hardware, said various items of hardware comprising at least two hardware versions;

a first parameter setting data generator for generating a portion of said parameter setting data for specified functions of a first of said at least two hardware versions; and a second parameter setting data generator for generating a portion of said parameter setting data for specified functions of a second of said at least two hardware versions.

15. The data transmission device of claim 14, wherein hardware items of said first hardware version read said common parameter setting data as well as said parameter setting data for said first hardware version and ignore said parameter setting data for said second hardware version, and hardware items of said second hardware version read said common parameter setting data as well as said parameter setting data for said second hardware version and ignore said parameter setting data for said first hardware version.

16. A method for setting parameters of a data receiving device, comprising: the steps of:

receiving a transmitted control code having parameter setting data for various hardware items of at least two different hardware versions, said at least two different hardware versions expecting to receive data in different formats, said parameter setting data for a first of said at least two different hardware versions being embedded in said control code in a data format and in a portion thereof recognized by said two different hardware versions, said parameter setting data for a second of said at least two different hardware versions being embedded into said control code in a data format recognized by said at least two different hardware versions, but in a portion thereof recognized by only one said at least two different hardware versions;

analyzing said received control code;

extracting a portion of said parameter setting data corresponding to, and recognized by one of said at least two different hardware versions; and setting the parameters of said various hardware items of said one hardware version based on said extracted parameter setting data.

17. The method for setting parameters of a data receiving device of claim 16, wherein said control code further comprises:

parameter setting data common to hardware items of all hardware versions;

parameter setting data for only specified functions for hardware items of said one hardware version; and parameter setting data for only specified functions for hardware items of a second of said at least two hardware versions.

18. The method for setting parameters of a data receiving device of claim 17, wherein said control code is analyzed and the parameters of hardware items for each hardware version are set based on parameter setting data corresponding to the hardware version of the hardware item.

19. The method for setting parameters of a data receiving device of claim 18, wherein said common parameter setting data is analyzed and parameters of respective hardware items of each hardware version are set based on said common parameter setting data.

20. The method for setting parameters of a data receiving device of claim 17, further comprising the steps of:

generating discrimination data for discriminating between hardware items of said at least two hardware versions;

embedding said discrimination data in a header of said control code;

analyzing said parameter setting data based upon said discriminating data; and setting parameters of hardware items of at least two different hardware versions based upon respective parameter setting data.

21. The method for setting parameters of a data receiving device of claim 17, wherein hardware items of said first hardware version read said parameter setting data for said first hardware version and ignore said parameter setting data for said second hardware version; and hardware items of said second hardware version read said parameter setting data for said second hardware version and ignore said parameter setting data for said first hardware version.

22. The method for setting parameters of a data receiving device of claim 21 wherein hardware items of said first and second hardware versions read said common parameter setting data versions, analyze said common parameter setting data, and set parameters of said first and second hardware versions based on said common parameter setting data.

23. A data receiving device, comprising:

a separator for separating received main data from a control code, said control code containing parameter setting data for various hardware items of a plurality of hardware versions, said at least two different hardware versions expecting to receive data in different formats, said parameter setting data for a first of said at least two different hardware versions being embedded in said control code, in a data format and in a portion thereof recognized by said two different hardware versions, said parameter setting data for a second of said at least two different hardware versions being embedded into said control code in a data format recognized by said at least two different hardware versions, but in a portion thereof recognized by only one said at least two different hardware versions;

a parameter setter for analyzing said control code and setting parameters of said hardware items in accordance with parameter setting data corresponding to the hardware version of each hardware item; and a processor for processing the main data separated by said separator, said processor including hardware in which the parameters have been set by said parameter setter.

24. The data receiving device of claim 23, wherein said control code further comprises parameter setting data common to various hardware items of different hardware versions.

25. The data receiving device of claim 24, wherein said parameter setter analyzes said common parameter setting data and sets parameters of respective hardware items based on said common parameter setting data.

26. The data receiving device of claim 24, wherein said control code further comprises a header containing discrimination data for discriminating between hardware aversions; and wherein said parameter setting data is analyzed in accordance with said discrimination data.

27. The data receiving device of claim 23, wherein said parameter setter sets the parameter settings for new version hardware based upon parameter setting data for the new hardware version ands disregards parameter setting data for old version hardware.

28. A data transmitting system, comprising:

a data transmitting device, comprising:

parameter setting data generating means for generating parameters setting data or different hardware versions of various hardware items of data receiving device, at least two of said various items of hardware comprising different versions, and expecting to receive data in different formats; and transmission means for transmitting a control code, including at least said parameter setting data, and main data, a first of said parameter setting data being embedded into said control code in a data format, and in a portion thereof recognized by said at least two of said various items of hardware, a second of said parameter settings data being, embedded into said control code in a data format recognized by said at least two of said various items of hardware, but in a portion thereof recognized by only one of said at least two of said various items; and a data receiving device, comprising:

receiving means for receiving said control code and said main data transmitted by said data transmitting device;

separating means for separating said received main data from said control code;

parameter setting means for analyzing said control code and setting parameters of various hardware items of different hardware versions based on said parameter setting data corresponding to the hardware version of each said hardware item; and processing means for processing said main data by said hardware items whose parameters have been set by said parameter setting means.

29. The data transmitting system of claim 28, wherein said parameter setting data generating means includes common parameter setting data generating means for generating parameter setting data common to hardware items of all hardware versions, such that said control code includes said common parameter setting data and said parameter setting data for hardware items of different hardware versions; and wherein said parameter setting means is operable to analyze said common parameter setting data and said parameter setting data for hardware items of different hardware versions and to set the parameters for various hardware items based on the common parameter setting data and the parameter setting data for the corresponding hardware version.

30. The data transmitting system as claimed in claim 28, wherein said control code further comprises a header including at least discrimination data for discriminating between hardware versions; and wherein said parameter setting means includes means for analyzing said control code utilizing said discrimination data and for setting said parameters of said various hardware items based on the parameter setting data for the discriminated hardware version.

31. The data transmitting system as claimed in claim 30, wherein said means for analyzing is operable to analyze parameter setting data common to hardware items of different versions as well as said parameter setting data for different hardware items of different hardware versions based on the parameter setting data for the discriminated hardware version.

32. The data transmitting system as claimed in claim 28 wherein said data transmission means is operable to position the parameter setting data for a new hardware version in a portion of the control code which is ignored by hardware items of an old hardware version and to transmit the control code containing both the parameter setting data of the old hardware version and the parameter setting data of the new hardware version; and wherein said parameter setting means is operable to set the parameters of hardware items of both the old and new hardware versions based upon the parameter setting data corresponding to the hardware version of each hardware item.

33. The data transmitting system as claimed in claim 32 wherein said parameter setting data generating means further comprises common parameter setting data generating means for generating parameter setting data common to hardware items of all hardware versions, such that said control code includes said common parameter setting data and said parameter setting data for said different hardware versions; and wherein said parameter setting means is operable to analyze said common parameter setting data and said parameter setting data for said different hardware versions and to set the parameters for various hardware items based on the parameter settings for the corresponding hardware version.

* * * * *